July 17, 1951    D. L. SINGER    2,560,705
SPACING GAUGE FOR BUTTONHOLES
Filed April 6, 1950
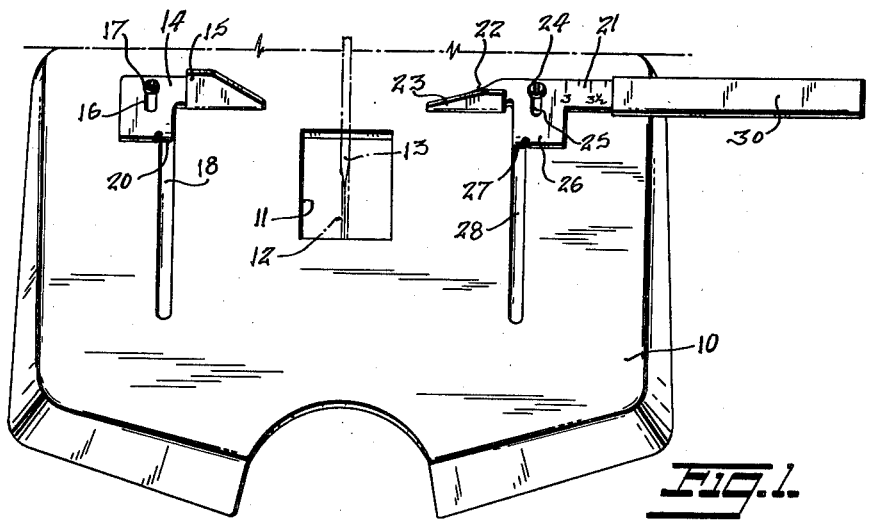
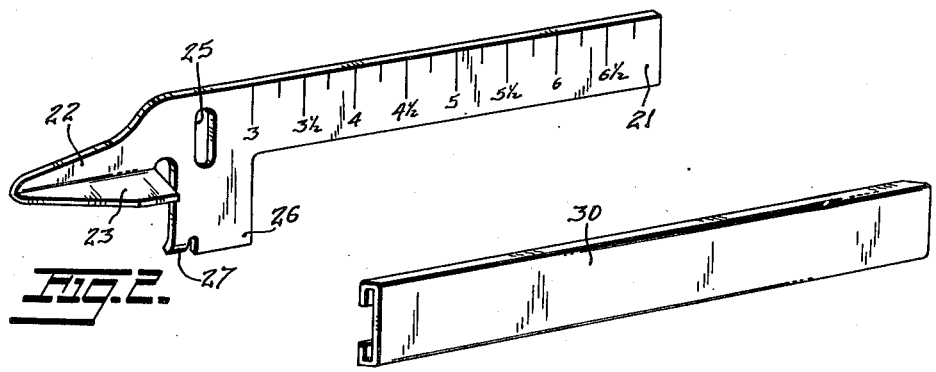
INVENTOR.
DAVID L. SINGER
BY
ATTORNEY Patented July 17, 1951

2,560,705

UNITED STATES PATENT OFFICE 2,560,705

SPACING GAUGE FOR BUTTONHOLES

David L. Singer, Brooklyn, N. Y.

Application April 6, 1950, Serial No. 154,359

5 Claims. (Cl. 112—75)

This invention relates to new and useful improvements in a buttonhole cutting and stitching machine and, more particularly to a gauge for accurately spacing the buttonholes being formed.

A known machine of the type described is provided with adjustable guides against which the edge of the material being worked on is placed accurately to locate the buttonholes relative to said edge.

One object of the invention is to modify one of said adjustable guides in such manner that the same includes also an adjustable gauge for accurately spacing apart the buttonholes being formed.

Another object of the invention is to construct the said gauge so that the same is quickly and easily settable to indicate the desired buttonhole pitch.

Still another object of the invention is to construct said gauge so that the same is capable of being manufactured at a low cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a fragmentary plan, partially diagrammatic, perspective view of the working table of a buttonhole forming machine with the gauge of the invention mounted thereon.

Fig. 2 is a perspective view of a portion of the gauge shown in Fig. 1.

Fig. 3 is a perspective view of an adjustable sleeve for said gauge.

Fig. 4 is a perspective view of the assembled gauge.

Fig. 5 is a sectional view of the assembled gauge on line 5—5 of Fig. 4.

Referring to Fig. 1, the reference numeral 10 indicates the work table of a well-known buttonhole forming machine, said table having at its lateral center an opening 11 in which the buttonhole cutting means 12 and the sewing needle 13 operate. These elements are so familiar to those skilled in this art that a diagrammatic illustration of them is deemed sufficient. In the known machine a pair of guides 14 were adjustably mounted on the table 10, but in accordance with the invention one such guide, namely the right-hand one, is replaced by means to be described hereinafter. The remaining guide 14 comprises a sheet metal piece having an upturned ear 15 against which the edge of the material being worked on can be placed, accurately to locate the buttonholes being formed relative to said edge. To provide for adjustment of said guide to vary the distance between the buttonholes and the edge of the material in which they are formed, the guide 14 has therein a front to rear slot 16 through which projects the stem of a headed screw 17 threaded into table 10. In order to prevent angular displacement of the guide 14 the table 10 is provided with a front to rear groove 19 into which extends a bent off tail 20 of the guide 14.

According to the invention the means utilized at the right-hand side of table opening 11 in place of a guide 14 includes adjustable guide means to cooperate with the guide 14 and also adjustable gauge means whereby the buttonholes being formed can be spaced apart accurately.

This means includes a sheet metal strip 21, see Fig. 2, having at one end thereof a nose 22 from which an ear 23 is bent off. As shown in Fig. 1 the strip is adjustably secured to table 10 by means of a headed screw 24 passing through a slot 25 therein and threaded into the table. The strip 21 is also formed with a forwardly extending portion 26 from which a tail 27 is bent downward into a groove 28 like, in all respects, the groove 18, to prevent angular displacement of the strip. Beyond the forward extension 26, beginning at the rightward edge of said extension, the strip 21 is ruled and has measurement indicia imprinted thereon in any suitable manner. A sheet metal sleeve or cover 30, see Figs. 3, 4 and 5, is mounted on the strip 21 so as to be slidable lengthwise thereof. Preferably the sleeve 30 is of a length sufficient to encase the strip 21 from the extension 26 to the end thereof.

The construction is such that the right-hand edge of the forward extension 26 is located from the needle 13 and cutting means 12 a distance equal to the minimum spacing of the buttonholes being formed, as here shown, three inches. If the buttonholes are to be spaced a lesser distance, a modified strip 21 having the right-hand edge of the extension the desired distance from the needle would be utilized. When the spacing between buttonholes is greater than the minimum, the screw 24 is loosened and the sleeve 30 slid to the right until its left-hand edge is aligned with the appropriate indicia line. The screw is then re-tightened, securing the sleeve in its adjusted position.

Once the sleeve has been adjusted the operation is as follows:

The position for the first of a series of buttonholes to be formed in a garment is marked in the usual manner by soap or chalk. The edge of the garment is then placed against the ears 15 and 23, and by means of needle 13 and cutting means 12, the first buttonhole is formed. The garment is then moved toward the right across the top of the table 10 until the already formed first buttonhole is aligned with the adjusted left-hand edge of sleeve 30. This aligns the said needle and cutting means with the position of the garment appropriate to the second buttonhole, and so on.

It will be seen that by the simple gauge means of the invention the whole operation of measuring the garment and marking the position of each buttonhole is eliminated, the positional marking of only the first buttonhole being required. This, of course, represents a large saving in time and expense in the mass production of buttonholes.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:

1. In a buttonhole forming machine having a working table with an opening therein in which a cutting element and a sewing needle cooperate to form the buttonholes, the combination of an adjustable guide on one side of said opening against which the material is placed to space the buttonholes from the edge of the material, and adjustably secured to the table on the other side of said opening a combined edge guide and gauge for spacing the buttonholes apart, said combined guide and gauge comprising a ruled measurement indicia bearing strip extending laterally from said opening and mounted on said table for front to rear adjustment, a forward extension on said strip, an ear bent up from said strip between said extension and the needle and cutting element to act as a guide for the edge of the material to be worked on, said ruling and indicia beginning at the edge of said extension furthest from the needle and cutting element, and a sleeve embracing the ruled portion of said strip and adjustable lengthwise thereof.

2. In a buttonhole forming machine having a working table with an opening therein in which a cutting element and a sewing needle cooperate to form the buttonholes, the combination of an adjustable guide on one side of said opening against which the material is placed to space the buttonholes from the edge of the material, and adjustably secured to the table on the other side of said opening a combined edge guide and gauge for spacing the buttonholes apart, said combined guide and gauge comprising a ruled measurement indicia bearing strip extending laterally from said opening, a forward extension on said strip, a front to rear slot in said extension, a headed screw passing through said slot and threaded into said table, a front to rear groove in said table, a tail bent downward from said extension into said groove, an ear bent up from said strip between said extension and the needle and cutting element to act as a guide for the edge of the material to be worked on, said ruling and indicia beginning at the edge of said extension furthest from the needle and cutting element, and a sleeve embracing the ruled portion of said strip and adjustable lengthwise thereof.

3. In a buttonhole forming machine having a working table with an opening therein in which a cutting element and a sewing needle cooperate to form the buttonholes, the combination of an adjustable guide on one side of said opening against which the material is placed to space the buttonholes from the edge of the material, and adjustably secured to the table on the other side of said opening a combined edge guide and gauge for spacing the buttonholes apart, said combined guide and gauge comprising a ruled measurement indicia bearing strip extending laterally from said opening and mounted on said table for front to rear adjustment, a forward extension on said strip, an ear bent up from said strip between said extension and the needle and cutting element to act as a guide for the edge of the material to be worked on, said ruling and indicia beginning at the edge of said extension furthest from the needle and cutting element, and a sleeve embracing the ruled portion of said strip and adjustable lengthwise thereof, whereby the minimum spacing between buttonholes is measured by the distance between said needle and cutting element and the furthest edge of said extension.

4. In a buttonhole forming machine having a working table with an opening therein in which a cutting element and a sewing needle cooperate to form the buttonholes, the combination of an adjustable guide on one side of said opening against which the material is placed to space the buttonholes from the edge of the material, and adjustably secured to the table on the other side of said opening a combined edge guide and gauge for spacing the buttonholes apart, said combined guide and gauge comprising a ruled measurement indicia bearing strip extending laterally from said opening, a forward extension on said strip, a front to rear slot in said extension, a headed screw passing through said slot and threaded into said table, a front to rear groove in said table, a tail bent downward from said extension into said groove, an ear bent up from said strip between said extension and the needle and cutting element to act as a guide for the edge of the material to be worked on, said ruling and indicia beginning at the edge of said extension furthest from the needle and cutting element, and a sleeve embracing the ruled portion of said strip and adjustable lengthwise thereof, whereby the minimum spacing between buttonholes is measured by the distance between said needle and cutting element and the furthest edge of said extension, and the desired spacing between buttonholes is measured by the distance between the needle and cutting element, and the near edge of the adjusted sleeve.

5. In a buttonhole forming machine having a working table with an opening therein in which a cutting element and a sewing needle cooperate to form the buttonholes, the combination of an adjustable guide on one side of said opening against which the material is placed to space the buttonholes from the edge of the material, a combined edge guide and gauge adjustably secured to the table on the other side of said opening for spacing the buttonholes apart, said combined guide and gauge comprising a ruled measurement indicia bearing strip extending laterally from said opening and lying at least partially on top of the table, a forward extension on said strip, a front to rear slot in said extension, a headed screw passing through said slot and threaded into said table, a front to rear groove in said table, a tail bent downward from said extension into said groove to prevent angular displacement of said strip, an ear bent up from said strip between said extension and the needle and cutting element to act as a guide for the edge of the material to be worked on, said ruling and indicia beginning at the edge of said extension furthest from the needle and cutting element, and a sleeve embracing the ruled portion of said strip and adjustable lengthwise thereof, said sleeve having a portion between the contacting faces of the table and said strip, said screw when tightened causes said strip to press on said sleeve at said portion located between the table and said strip to frictionally maintain said sleeve in desired adjusted positions, whereby the minimum spacing between buttonholes is measured by the distance between said needle and cutting element and the furthest edge of said extension, and the desired spacing between buttonholes is measured by the distance between the needle and cutting element, and the near edge of the adjusted sleeve.

DAVID L. SINGER.

REFERENCES CITED

The following references are of record in the file of this patent:

UNITED STATES PATENTS

| Number | Name | Date |
| --- | --- | --- |
| 1,343,149 | Morgen et al. | June 8, 1920 |